Figure 1:
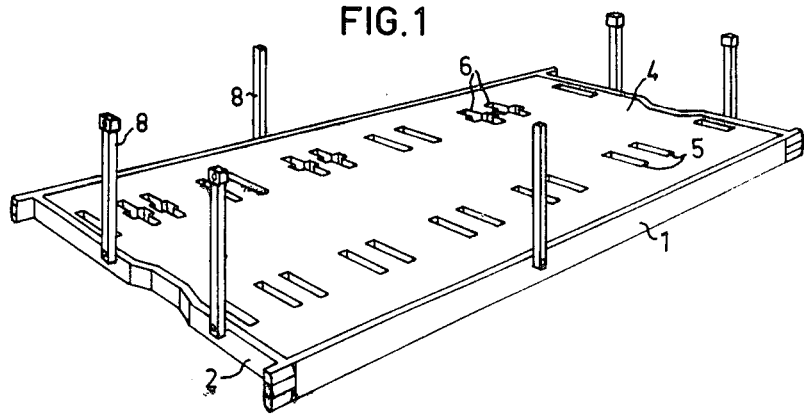

United States Patent

[11] 3,623,688

[72] Inventor Bo Kent Ansund
 Gothenburg, Sweden
[21] Appl. No. 52,526
[22] Filed July 6, 1970
[45] Patented Nov. 30, 1971
[73] Assignee Trascandica A. G.
 Uetikon am See, Switzerland
[32] Priority July 18, 1969
[33] Sweden
[31] 10,214/69

[54] SECURING MEANS IN VEHICLE-TRANSPORTING PLATFORMS
 4 Claims, 4 Drawing Figs.
[52] U.S. Cl. ................................................ 248/119 R,
 105/368 R, 188/32, 248/361 R
[51] Int. Cl. ........................................................ B60p 7/06
[50] Field of Search............................................ 105/368 R,
 368 T; 214/16.1 CA; 248/17, 25, 119 R, 361 R;
 280/179 R

[56] References Cited
UNITED STATES PATENTS
| | | | |
|---|---|---|---|
| 1,495,442 | 5/1924 | Rosencrans | 248/119 X |
| 1,848,930 | 3/1932 | Blakely | 248/119 |
| 3,221,907 | 12/1965 | O'Sullivan | 188/32 X |

Primary Examiner—Duane A. Reger
Attorney—Young & Thompson

ABSTRACT: The invention relates to a securing arrangement in platforms for transporting vehicles such as cars in a cargo ship, said arrangement comprising a plate adapted to support a vehicle wheel and being movable vertically relatively to the platform and also being pivotally secured to one end of a bellcrank lever projecting outwardly on either side of the plate, said bellcrank lever being pivotally journaled on a journal pin on a bracket secured to a firm part of the platform, said bellcrank lever at the other end being provided with a pivotable locking member having clamping means for the wheel and the arrangement being such that as the lever with the locking member is swung inwardly towards the wheel when the plate is lowered relatively to the platform then the wheel will be locked.

SECURING MEANS IN VEHICLE-TRANSPORTING PLATFORMS

The present invention relates to a securing arrangement in platforms intended for transporting vehicles, e.g. in ships and on railways. To facilitate loading and stowing of cars, for example, it is of decisive importance that the vehicles can be rapidly parked on the platform and secured in a manner whereby damage is avoided during transport. The task of driving cars on board a ship and then stowing and securing the cars is time consuming and, furthermore, offers no guarantee that the vehicles are mutually immovable. Consequently, liftable vehicle-transporting platforms have been constructed with recesses for the wheels of the vehicle whereby the vehicle rests on the platform with supports against the frame or other supporting portions, so that the loaded platform with a number of vehicles arranged thereon can be lifted as a unit by means of a crane or the like and placed in the intended position in the hold. The platform may be provided with collapsible support struts, whereby several loaded platforms can be placed one upon the other.

Even though the vehicles are normally unable to move relatively to the platform, securing arrangements are required to ensure that the vehicles are retained in position under all conditions, and for this reason in accordance with the invention at least one of the wheels is clamped securely during transport by means of an automatically opening and locking securing arrangement, which is mainly characterized in that it comprises a supporting plate upon which one wheel of the vehicle is placed and which is movable in a vertical direction relative to the platform and is pivotally secured at one end on a bellcrank lever projecting on either side of the plate, the bellcrank lever being pivotally journaled on a journal pin on a bracket or the like secured to a stationary portion of the platform, and in that the bellcrank lever at the other end thereof is provided with a pivotable latch having clamping means for the wheel, the lever together with the latch being swung inwardly towards the wheel when the plate is lowered relatively to the platform, thereby securely locking said wheel.

Figure 2:
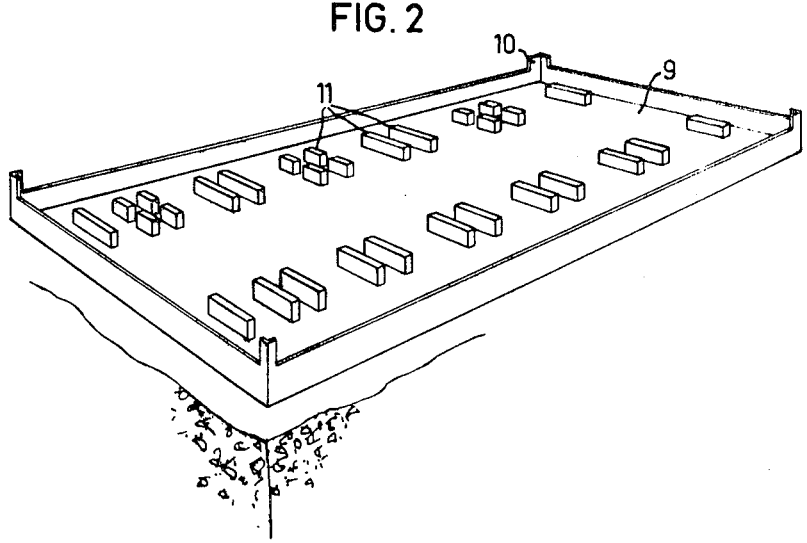
Figure 3:
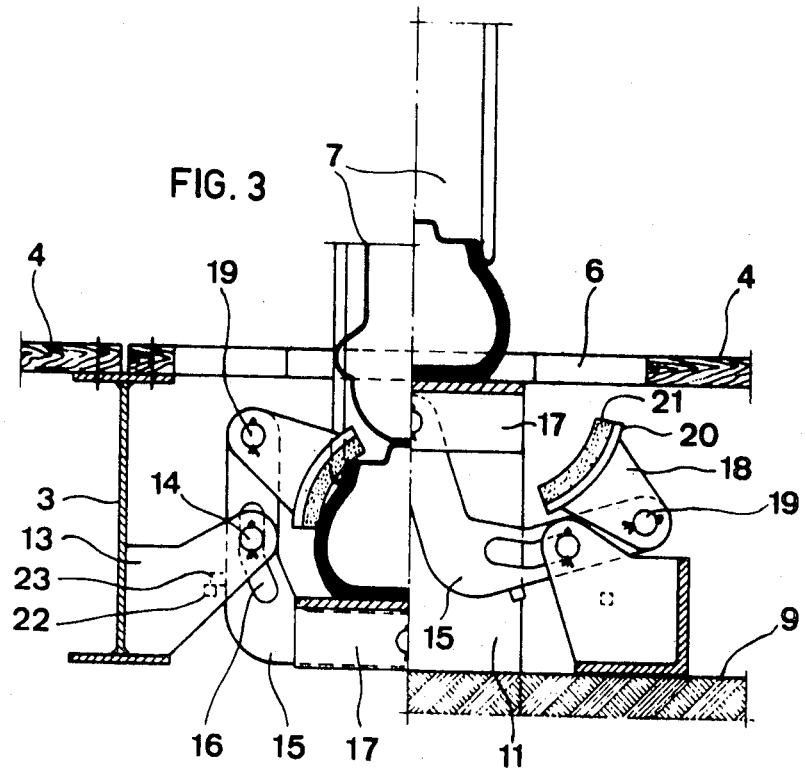
Figure 4:
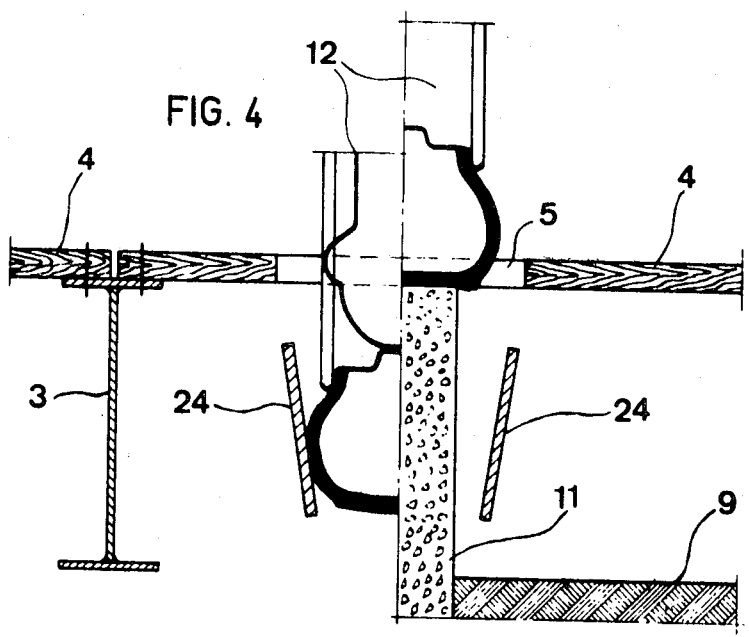

An embodiment of the invention will now be described with reference to the accompanying drawings, in which FIG. 1 is a perspective view of a transporting platform adapted for six cars, FIG. 2 is a perspective view of a bed for the platform used when the vehicles are positioned thereon, FIG. 3 is a cross-sectional view through a portion of the platform of FIG. 1, having an automatic securing arrangement for a wheel in two different positions, and FIG. 4 is a cross-sectional view through an arrangement for preventing another wheel of the vehicle from moving laterally, this also being shown in two different positions.

The vehicle-transporting platform comprises a frame work of robust girders 1, 2 having extending therebetween crossbeams 3 over which a support surface 4, suitably made of wood or the like, is placed. The support surface or deck in the illustrated embodiment is intended to accommodate six cars and should be sufficiently strong to carry the total weight of all cars. Disposed in the deck 4 are openings 5, 6 for each of the wheels of the vehicles, the openings being so shaped that the wheels can be freely lowered into the same. One of the openings 6 for each vehicle, normally for one of the front wheels 7, presents in the middle part thereof lateral recesses for an automatic securing arrangement, to be described hereinafter. Collapsibly mounted on the side edges of the platform are support struts 8, the height of which is somewhat greater than the height of the vehicle thereby permitting loaded transporting platforms to be placed in superposed relationship. During the return journey of the platforms, the support struts are collapsed so that the platforms do not occupy unnecessary storage space.

To facilitate loading of the vehicles on the platform a loading station is erected on the quai, said loading station mainly comprising a countersunk bed 9, in which the platform fits and can be guided downwardly by means of corner guide structures 10. Securely cast on the bed 9 is a number of plinths 11 made of concrete or the like and each of which fits into one of the platform openings 5, 6. The height of the plinths 11 is such that when the platform rests on the bed they project up flush with the lower surface of the deck 4 and permit the vehicle to be driven unhindered into position, as shown to the right of FIGS. 3 and 4. When the wheels roll down into the shallow recesses, the vehicle will settle, thereby indicating that it is correctly positioned on the platform.

The platform is provided in a conventional manner with devices for hooking chains to a crane, and as soon as the platform begins to rise from the ground the wheels sink into the openings until some portion of the chassis, e.g. the jacking points, abut against the deck. Means are arranged on the support surface onto which the platform is to be positioned, e.g. the floor of the hold of a ship or a goods carriage, so that the loaded platform, when placed in position, will rest only on the frame 1, 2 with the vehicle wheels 7, 12 free from said support surface. In most cases no securing arrangements are required in order to retain the vehicle in position during transportation thereof, although as a safety measure against radical shifts and tilting in heavy sea conditions an automatically functioning securing arrangement has been constructed in accordance with the invention, the arrangement gripping around the rim and/or tire of a vehicle wheel.

Secured to the crossbeam 3 or some other firm portion beneath the deck 4 are pairs of transversely extending brackets 13 arranged right in front of the openings 6 and comprising bearings for a journal pin 14. A bellcrank lever 15 is pivotally and displaceably mounted on the pin 14, which extends through an elongated opening 16 in the lever 15, said lever supporting at one end a pivotally mounted plate 17 on which the wheel 7 can rest, and on the other end is a locking member 18 pivotally journaled on a pin 19. The locking member 18 is provided on the free end with a shoe 20, suitably lined with a layer of rubber 21, plastics or some other soft material and adapted to abut against the side of the rim and the tire of the wheel 7. The bellcrank lever 15 with the plate 17 and the locking member 18 form an automatically functioning securing arrangement for the wheel 7; the arrangement being duplicated on the opposite side of said wheel.

When the platform is placed onto the bed 9 and guided into position, the plinths 11 take a position beneath the plate 17 and urge said plate upwards, as is shown in the right portion of FIG. 3. The bellcrank levers 15 then rotate about their respective journal pins 14, which are simultaneously moved in the elongated openings 16, whereby the end of the bellcrank lever 15 is drawn downwards together with the locking member 18, which simultaneously pivots on the pin 19. In the end position, the plate 17 substantially occupies the whole of the opening 6 in the platform whereby the wheel 7 easily can roll into position on the platform.

When the platform 4 with the vehicles positioned thereon is lifted from the bed 9, the plate 17 gradually sinks under the influence of its own weight and the weight of the vehicle, whereby the lever 15 swings back until the arm provided with the locking member 18 substantially takes a vertical position, as shown in the left portion of FIG. 3. Before this has taken place, the locking member 18, during the inwardly and upwardly swinging movement, has taken a position against the rim and the tire of the wheel 7 and is urged during the last phase of the movement outwardly from the bellcrank lever 15, thereby forming an effective securing means both laterally and longitudinally. To prevent the plate 17 from sinking too far, the bracket 13 is provided with an abutment 22 and is mounted on the bellcrank lever 15.

As an extra security against lateral movements, a wedge means can be arranged for another wheel 12, the wedge means comprising plates 24 which are inclined obliquely in the longitudinal direction of the vehicle beneath the platform 4 on both sides of the opening 5, and between which plates the tire of the wheel 12 is securely clamped when the wheel is lowered. In combination with the aforedescribed securing arrangement, the vehicle is thereby supported in all directions and since locking and unlocking are effected at the same time as the platform 4 is lifted or lowered from or down onto the bed 9 there is no need to check that the securing means is engaged. Loading and unloading of the vehicles can therefore be effected very rapidly.

What I claim is:

1. A securing arrangement in platforms for transporting vehicles such as cars in a cargo ship, in which said securing arrangement comprises a plate adapted to support a vehicle wheel, and a bellcrank lever, said plate being movable vertically relatively to the platform and being pivotally secured to one end of said bellcrank lever projecting outwardly on either side of the plate, a bracket structure being firmly secured to the platform and being provided with a journal pin for said bellcrank lever, said other end of the bellcrank lever being provided with a pivotable locking member having clamping means for the wheel, said end of the lever with the locking member being swung inwardly towards the wheel when the plate is lowered relatively to the platform thereby locking the wheel.

2. An arrangement as claimed in claim 1, in which said lever is provided with an elongated opening for the journal pin, whereby said other end of the lever may also move angularly of the platform.

3. An arrangement as claimed in claim 1, in which raising of the plate and outward swinging of the lever is effected by a plinth on a loading bed, said plinth being adapted to press the plate from beneath towards the deck of the platform.

4. An arrangement as claimed in claim 1, in which the locking member is provided with a shoe which is coated with a soft material and is shaped to conform to the rim and the tire of the vehicle wheel.

* * * * *